United States Patent [19]

Hayes

[11] 3,890,014

[45] June 17, 1975

[54] DIRECTIONALLY RESPONSIVE BRAKING SYSTEM

[75] Inventor: Edward J. Hayes, Ann Arbor, Mich.

[73] Assignee: Kelsey-Hayes Company, Romulus, Mich.

[22] Filed: May 16, 1973

[21] Appl. No.: 360,822

[52] U.S. Cl. ................................. 303/24 R
[51] Int. Cl. ................................. B60t 8/00
[58] Field of Search ......... 303/6 R, 6 C, 6 A, 24 R, 303/24 A; 188/176, 177

[56] References Cited
UNITED STATES PATENTS

| | | | |
|---|---|---|---|
| 3,035,869 | 5/1962 | Francia | 303/24 R |
| 3,533,425 | 10/1970 | Hannan | 303/24 R |
| 3,742,164 | 6/1973 | McMullen | 303/24 R |

Primary Examiner—George E. A. Halvosa
Assistant Examiner—Stuart M. Goldstein
Attorney, Agent, or Firm—Harness, Dickey & Pierce

[57] ABSTRACT

A braking system including at least one fluid operated brake on each lateral side of a vehicle, a system for performing a fluid modulating operation including first and second proportioning valve assemblies for supplying modulated fluid pressure to the brakes, and weighted elements responsive to a directional change of the associated vehicle for altering the fluid modulating operation of the first and second proportioning valve assemblies.

17 Claims, 1 Drawing Figure

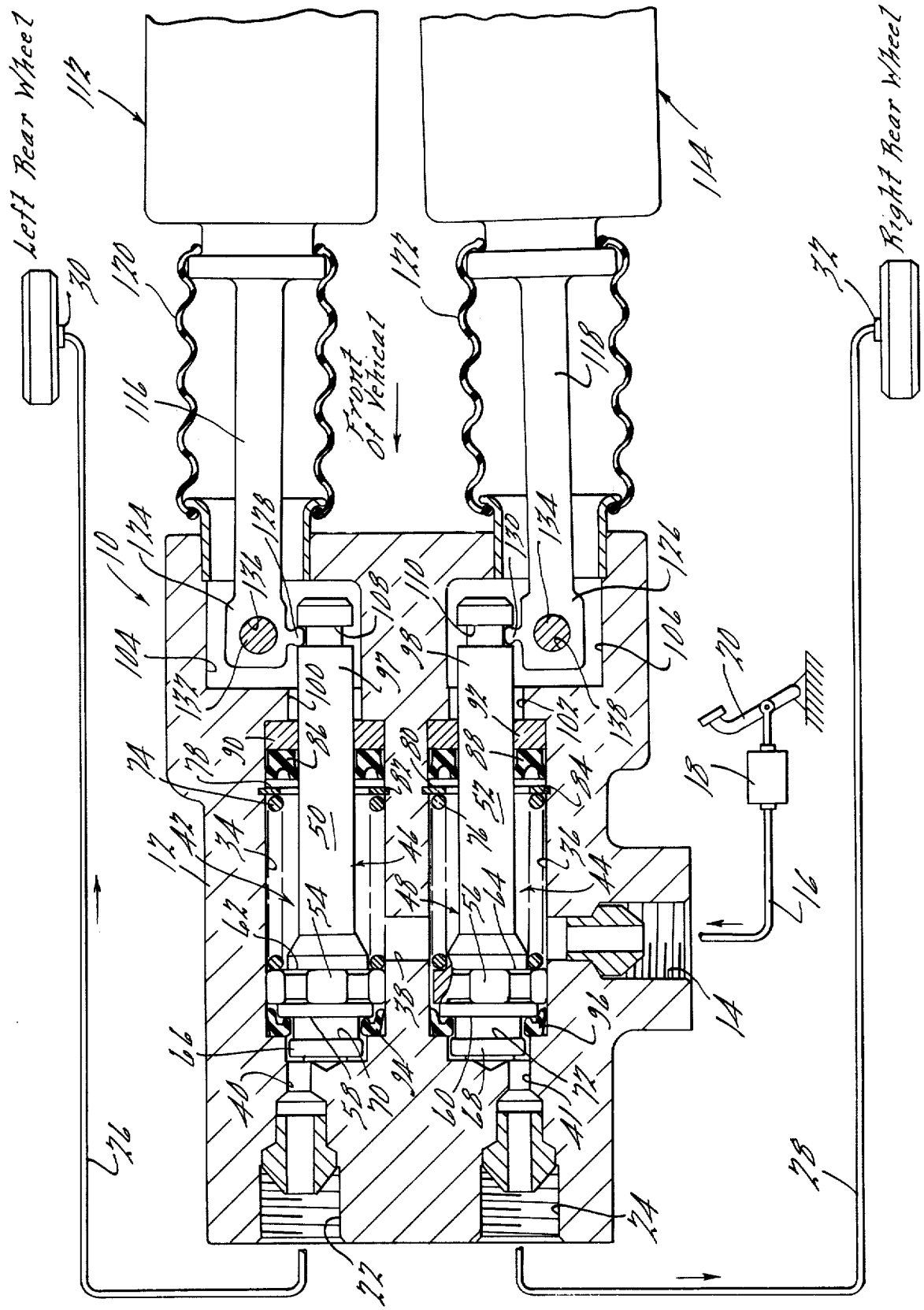

DIRECTIONALLY RESPONSIVE BRAKING SYSTEM

BACKGROUND OF THE INVENTION

1. Field of the Invention

Proportioning devices for vehicle hydraulic brake systems.

2. Description of the Prior Art

It is well known that the proportion of a vehicle's weight that is borne by the front and rear wheels of a vehicle is dependent upon the magnitude of the deceleration of the vehicle, and in recognition of this phenomena, various proportioning devices have heretofore been proposed that are responsive to master cylinder outlet pressure and which serve to limit the brake pressure supplied to the vehicle's rear wheels upon attainment of the predetermined master cylinder outlet pressure. It is also recognized that a lateral weight shift occurs in a vehicle as the same traverses a corner or turns along an arcuate roadway, resulting in the wheels on the outside of the turn bearing a proportionately larger amount of vehicle weight and the wheels on the inside of the turn bear a proportionately lesser amount of the vehicle weight. Accordingly, a greater braking effort is required for those wheels on the outside of the turn, while a lesser braking effort is required for those vehicle wheels confronting the inside of the turn.

The present invention is directed toward a new and improved valve assembly that is not only adapted to accommodate for the longitudinal shift in vehicle weight during a normal braking operation, but which is also adapted to accommodate for the lateral shift of vehicular weight that occurs when a vehicle traverses a turn or corner. More particularly, the present invention is directed toward a valve assembly of the above-described type that incorporates a pair of proportioning valves which operate in a manner known in the art in proportioning or modulating the fluid pressure supplied to the rear wheels of a vehicle during a braking operation. The proportioning valves are operatively associated with means for sensing a change in direction of the vehicle, whereby to cause the proportioning valve supplying fluid to the wheels on the inside of the turn to have a reduced fluid pressure supplied thereto, while the wheels on the outside of the turn are supplied a greater fluid pressue due to the greater braking effort needed to accommodate for the increased vehicular weight borne by the outside wheels, as will hereinafter be described in detail.

It is accordingly a general object of the present invention to provide a new and improved vehicle braking system.

It is a more particular object of the present invention to provide a new and improved proportioning valve assembly which is responsive to directional changes of the vehicle.

It is still a more particular object of the present invention to provide a new and improved valve assembly which includes a pair of proportioning valves that are operable in a manner well known in the art in proportioning fluid to the rear brakes of a vehicle from the associated master cylinder, and which are further operable in response to a change in direction of the vehicle to control the fluid pressure supplied to the wheels on the inside and the outside of a turn along which the associated vehicle is traversing.

It is still another object of the present invention to provide a valve assembly of the above-described type which is of a relatively simple design, is economical to manufacture and which will have a long and effective operational life.

Other objects and advantages of the present invention will become apparent from the following detailed description taken in conjunction with the accompanying drawing.

BRIEF DESCRIPTION OF THE DRAWING

The drawing is a cross-sectional view of the proportioning valve assembly in accordance with one preferred embodiment of the present invention and is illustrated in operative association with a schematically depicted vehicular brake system.

DESCRIPTION OF A PREFERRED EMBODIMENT

Referring now in detail to the drawing, a valve assembly 10, in accordance with one preferred embodiment of the present invention, is shown generally as comprising a valve housing 12 defining an inlet port 14 at the lower end or side thereof. The inlet port 140 is communicable via a suitable fluid conduit 16 with the master brake cylinder 18 of an associated brake system, the master cylinder 18 being operable in response to actuation of an associated brake pedal 20 to communicate fluid via the conduit 16 to the valve assembly 10 of the present invention. The valve housing 12 is also provided with a pair of outlet ports 22 and 24 which are communicable via fluid conduits 26, 28, respectively, with the left and right rear brake cylinders 30 and 32, respectively, of the associated vehicle. As will hereinafter be described in detail, the valve assembly 10 normally provides an open fluid path from the master cylinder 18 to the brake cylinders 30, 32 until the fluid pressure in the system increases to a predetermined level in response to actuation of the brake pedal 20, at which time the valve assembly 10 blocks or closes the fluid path. The valve assemmbly 10 will thereafter continue to modulate the fluid pressure supplied to the brake cylinders 30, 32. In addition, the valve assembly 10 is intended to function in controlling the fluid pressure supplied to the brake cylinders 30, 32 during such time as the associated vehicle undergoes a cornering situation during which condition the wheels on the inside and outside of the turn support proportionately smaller and greater, respectively, amounts of vehicle weight and thus the associated wheel cylinders require either reduced or increased fluid pressure in order to achieve efficient vehicular braking, as will hereinafter be described.

The valve housing 12 is formed with a pair of generally spaced parallel valve bores 34 and 36 that are communicable via a transversely extending cross bore or passage 38 which functions to communicate the inlet port 14 with both of the valve bores 34, 36. The bores 34, 36 are respectively communicable with the outlet ports, 22, 24 via a pair of fluid passages 40, 41 which extend between the inner ends of the ports 22, 24 and the extreme left ends of the valve bores 34 and 36. Disposed within the valve bores 34, 36 is a pair of valve assemblies 42 and 44 which are preferably similar in construction and operation as the valve shown in U.S. Pat. No. 3,423,936 assigned to the assignee of this application and which is incorporated by reference in the descriptive portion of this specification. More particularly, the valve assemblies 42, 44 comprise a pair of proportioning valve means or piston member 46 and 48 which are reciprocally mounted within the bores 34, 36 and include generally cylindrical body portions 50 and 52, respectively. The piston members 46, 48 are formed with radially outwardly extending annular flanges 54 and 56 at the left ends thereof, which flanges 54, 56 define upper annular shoulders 58, 60 and lower annular shoulders 62, 64, respectively. Disposed directly to the left of the flanges 54, 56, the piston members 46, 48 are formed with valve heads or shoulders 58, 60, respectively, that define annular valve seats or faces 70, 72, respectively, on the left sides thereof. The piston members 46, 48 are normally biased toward the left in the drawing by means of a pair of helical coil springs 74, 76 which extend around the members 46, 48, respectively, as illustrated. The extreme left ends of the springs 74, 76 engage the shoulders 62, 64, while the extreme right ends of the springs 74, 76 bear against a pair of annular snap rings or the like 78, 80 retained within the bores 34, 36 by being partially disposed within suitable annular grooves or recesses 82, 84 formed therein.

Disposed directly to the right of the snap rings 78, 80 is a pair of cup-type fluid seals 86 and 88, respectively, having inner peripheral portions adapted to slidingly sealingly engage the outer periphery of the associated of the piston members 46, 48, and outer peripheral portions adapted to sealingly engage the inner periphery of the associated of the valve bores 34, 36. The fluid seals 86, 88 are supported within the bores 34, 36 by means of suitable backing elements 90, 92 through which the leftward ends of the piston members 46, 48 extend. A pair of elastomeric annular valve members 94 and 96 are disposed at the extreme left ends of the valve bores 34, 36 and are adapted for selective engagement with the valve seats 70, 72 of the piston members 46, 48. A more detailed description of the construction of the valve members 94, 96 will be found in the aforementioned U.S. Pat. No. 3,423,936, incorporated by reference herein, however, by way of a brief explanation of the operation of the members 94, 96, normally a fluid path is provided between the master cylinder 18 and the brake cylinders 30, 32. This path includes the conduit 16, cross bore 38, valve bores 34, 36 and passages 40, 41, and finally the conduits 26, 28. The reason that this path is maintained open is that the springs 74, 76 bias the piston members 46, 48 to the left, whereby the valve heads 66, 68 are maintained disengaged from the valve members 94, 96. This path remains open until the fluid pressure delivered to the housing 12 from the master cylinder 18 attains a predetermined level. At that time, the piston members 46, 48 will be biased toward the right in the drawing, whereby the valve seat 70, 72 will engage the valve members 94, 96, thereby closing the aforesaid fluid path. The level of pressure at which this occurs is, of course, dependent upon the effective force of the springs 74, 76 compared to the effective areas of the piston members 46, 48 acted upon by the inlet fluid pressure in the direction opposing the force of the springs 74, 76. After the valve heads 66, 68 close against the valve members 94, 96 and the fluid pressure at the inlet port 14 is further increased by the associated master cylinder 18, the increased level of fluid pressure will act against the piston members 46, 48 over effective areas of the piston members 46, 48 such that a leftwardly directed force is exerted thereagainst, assisting the force of the springs 74, 76 and tending to reopen the valve members 94, 96 to deliver at least a portion of this increased fluid to the outlet port 22, 24 and eventually to the wheel cylinders 30, 32, and this opening and closing movement of the piston members 46, 48 will continue, whereby fluid will be modulated or proportioned to the rear brake system of the associated vehicle, as described in detail in the aforesaid U.S. Pat. No. 3,423,936.

The proportioning valve assemblies 42, 44 are intended to operate in the aforedescribed manner during the entire time the associated vehicle is operating in a relatively linear direction, i.e., traveling along a relatively straight roadway. In accordance with the principals of the present invention, however, means is provided for selectively controlling operation of the piston members 46, 48 at such time as the associated vehicle is traversing a relatively arcuate section of roadway, i.e., is turning either left or right. Toward this end, it will be noted that as a vehicle traverses a turn, in either a leftward or rightward direction, the wheels of the vehicle located on the inside of the turn support a proportionately lesser amount of the weight of the vehicle due to centrifugal force acting upon the vehicle. In a similar manner, the wheels of the vehicle on the outside of the turn support a proportionately greater amount of the vehicle's weight. Accordingly, less braking effort is required for the wheels on the inside of the turn, while a greater braking effort is required for the wheels on the outside of the turn. As will hereinafter be described in detail, the present invention is intended to function in controlling the operation of the proportioning valve assemblies 42, 44 which proportions braking fluid to the right and left wheels of the associated vehicle in a manner so as to compensate for the change in braking effort required of the laterally opposed vehicle brakes as the vehicle traverses a turn or a corner. More particularly, valve assembly 10 of the present invention operates such that the valve assemblies 42, 44 will tend to become closed, thereby limiting the flow of hydraulic fluid to the left and right rear wheels, respectively, as the associated vehicle is making left and right turns, and at the same time, the valve assemblies 42, 44 will tend to provide additional hydraulic fluid to brake cylinders associated with the vehicle wheels facing the outside of a turn when the vehicle is making a right or left turn in order to accommodate for the additional braking effort required, as will hereinafter be described in detail.

As shown in the drawing, the piston members 46, 48 have righward end portions 97, 98 that extend through reduced diameter bores 100, 102 arranged coaxially of the bores 34, 36. The terminal ends of the end sections 97, 98 are located within large diameter chambers 104, 106, respectively, and are formed with radially inwardly extending annular recesses 108 and 110, respectively, for purposes hereinafter to be described. Located directly to the right of the valve housing 12 is a pair of weighted elements 112 and 114 which are of predetermined mass and operatively connected via suitable linkages or arms 116 and 118 to the piston members 46, 48, respectively. The linkages or arms 116, 118, extend through suitable dirt shields or boots 120, 122 which are fabricated, for example, of a flexible rubber-like material or the like, with the leftwardmost ends 124, 126 of the linkages 116, 118 also terminating within the enlarged chambers 104, 106. The ends 124, 126 of the linkages 116, 118 are formed with generally laterally projecting lugs 128 and 130, respectively, adapted to be nestingly received within the annular recess, 108, 110 of the associated piston member 146, 148. The weighted elements 112, 114 are adapted to be pivotable relative to the housing 12 above transverse axes extending laterally therethrough. More particularly, the weighted elements 112, 114 are adapted to be connected via suitable pivot means in the form of pivot pins or the like 132 and 134 which are laterally spaced from one another and extend through suitable openings or bores 136, 138 in the ends 124, 126 of the linkages 116, 118.

In accordance with the present invention, the valve assembly 10 is adapted to be oriented within or upon the associated vehicle such that the left end thereof shown in the drawing is oriented toward the forward or front end of the vehicle, with the pivot pins 132, 134 being located along laterally spaced vertical axes, with the result that the weighted elements 112, 114 are free to pivot back and forth toward the left and right sides of the associated vehicle about the vertical axes defined by the pins 132, 134. In addition, the valve assembly 10 is intended to be oriented such that the upper side thereof shown in the drawing is located toward the left side of the vehicle, while the lower side thereof is located toward the right side of the vehicle, as indicated in the drawings.

Assuming that the valve assembly 10 is oriented within the associated vehicle in above described manner, whereby the elements 112, 114 are pivotal back and forth laterally of the direction of movement or longitudinal axis of the associated vehicle, and further assuming that the linkages or arms 116, 118 operatively connecting the weighted elements 112, 114 to the valve assemblies 42, 44, respectively, permit normal reciprocal or sliding movement of the piston members 46, 48 within their respective valve bores 34, 36 during normal forward movement of the associated vehicle, operation of the valve assembly 10 is as follows. During normal forward movement of the associated vehicle along a relatively linear or straight section of roadway, the components of the valve assembly 10 occupy their respective positions shown in the drawing. The brakes are applied by depressing the pedal 20 to operate the master cylinder 18 which results in fluid flow through the conduit 16 and crossbore 38 into the valve bores 34, 36. The fluid which is introduced into the valve bores 34, 36 will be proportioned or modulated to the brake cylinders 30, 32 in the above-described manner and as is set forth in detail in the aforementioned U.S. Pat. No. 3,423,936, with the piston members 46, 48 operating substantially in unison to effect such modulation. At such time as the vehicle begins to turn, for example, in a rightward direction, due to the centrifugal force acting upon the weighted elements 112, 114, the elements 112, 114 will be pivoted about the axes defined by the pivot means 132, 134 in a generally clockwise direction in the drawing, i.e., the rearward or rightward ends thereof will move downwardly. As this occurs, the action of the lug 128 within the recess 118 will cause the piston member 46 to be biased toward the left with a force which acts in conjunction with the force of the spring 74 to maintain the piston member 46 in an open position to provide for an unobstructed flow path from the valve bore 34 to the conduit 26 and hence to the left rear brake cylinder 30. Simultaneously, the lug 130 within the recess 110 of the piston member 48 will act to bias the piston member 48 toward the right in the drawing, i.e., against the resistance of the spring 76, whereby the valve head 68 will move toward sealing engagement with the valve members 96, whereby the path providing for fluid pressure from the valve bore 36 to the conduit 128 will become closed or restricted, with the result that a decreasing amount of fluid will be supplied to the right rear brake cylinder 32. The net result of the action of the weighted elements 112, 114 is to restrict the flow of fluid from the master cylinder 18 to the right rear brake cylinder 32 and permit a greater amount of fluid flow to the left rear brake cylinder 30, whereby to accommodate for the proportionately greater braking effort required on the left rear wheel of the vehicle due to the weight shift of the vehicle during the time the same undergoes a righthand turn. Conversely, at such time as the vehicle undergoes a lefthand turn, the weighted elements 112, 114 will pivot about their respective pivot means 132, 134 in a counterclockwise direction in the drawing, i.e., the rightward or rearward ends thereof will move upwardly in the drawing. Accordingly, the piston member 46 will be biased toward a closed position, and at the same time, the piston member 48 will be biased towards an open position, with the net result that fluid flow to the left rear wheel cylinder will become restricted, while substantially unimpeded fluid flow will be provided to the right rear wheel cylinder in order to accommodate for the greater braking effort required on the right rear wheels as the vehicle undergoes the lefthand turn. At such time as the vehicle again resumes a generally forward movement along a linear path, the weighted elements 112, 114 will resume their central or neutral position to permit normal operation of the proportioning valves 42, 44.

It will be noted that the linkage means 116, 118 operatively connecting the weighted elements 112, 114 to the piston members 46, 48 may be of various constructions, with the only requirement being that the normal proportioning operation of the valve assemblies 42, 44 is not inhibited while the vehicle is traveling straight ahead, while the fluid proportioning or modulating operation of the assemblies 42, 44 is sufficiently affected when the associated vehicle traverses a turn to assure that a proportionately greater amount of fluid pressure is supplied to the brake cylinder of the wheels on the outside of the turn and a proportionately lesser amount of fluid is supplied to the brakes of the wheels on the inside of the turn. In addition, it will be noted that while reference has been made to the valve assembly 10 operating to control the fluid pressure delivered to the brakes of the left rear and right rear wheels of the associated vehicle, it will be appreciated that the valve assembly 10 could work equally well on the brakes of the right and left front wheels of the vehicle or could work in conjunction with both the front and rear wheel brakes on the right and left sides of the vehicle.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A brake system including a pedal operated source of pressurized fluid and at least one fluid operated brake on each lateral side of a vehicle,
   modulating valve means for performing a fluid modulating operation on the existing fluid pressure in said brake system and thereby varying the pressure to the brakes under preselected braking conditions, said modulating valve means comprising
       a housing defining a fluid chamber communicable with one of said brakes and said source of pressurized fluid,
       a proportioning piston reciprocally disposed in said chamber and having a first portion having the fluid pressure of said source acting thereon and a second portion having the fluid pressure of said brake acting thereon,
       said piston being operable under the influence of said fluid pressure acting on said first and second portions thereof to move toward and away from a piston selectively blocking pressurized fluid from being communicated from said source thereof to said one brake, and thereby operate to modulate the fluid pressure supplied to said one brake, and
   means responsive to a change in direction of the vehicle for altering the fluid modulating operation of said piston.

2. The invention as set forth in claim 1 which includes a second modulating valve means of substantially the same construction as said first mentioned valve means, first and second means for independently controlling operation of said first and second modulating valve means.

3. The invention as set forth in claim 2 wherein said first and second means for operatively controlling said valve means are operable in response to a right and left turn, respectively, of the vehicle.

4. The invention as set forth in claim 3 wherein said means for controlling operation of said valve means are operable only during a cornering operation of the vehicle.

5. The invention as set forth in claim 4 wherein said means for controlling operation of said valve means are responsive to the centrifugal force produced during a cornering operation of the vehicle and act to selectively prevent proportioning operation of said pistons.

6. The invention as set forth in claim 4 wherein said means for controlling operation of said valve means comprise first and second actuating elements pivotable laterally of the vehicle about vertical axes.

7. The invention as set forth in claim 4 which includes spring means normally biasing said proportioning piston to a position operating a flow path from said source to said brakes, and wherein said actuating elements are pivotable about generally vertically extending laterally spaced axes for controlling operation of said spring means on said piston members.

8. The invention as set forth in claim 1 which includes a valve housing, a pair of generally laterally spaced bores in said housing, first and second piston members reciprocally mounted in said bores, spring means resiliently biasing said piston members toward a position opening a flow path from a fluid source to said brakes, first and second pivotally mounted actuating elements of predetermined mass operatively engaged with said piston members for controlling normal reciprocal movement thereof, one of said actuating elements causing the associated of said piston members to remain in an open position and the other of said actuating elements causing the associated of said piston members to be maintained in a closed position during turning movement of said vehicle.

9. A hydraulic brake system having right and left brake cylinders and a master cylinder for pressurizing said brake cylinders,
   pressure modulating valve means having passage means through which pressure is transmitted from the master cylinder to the brake cylinders,
   differential area piston means in said valve means operable to open and close said passage means to perform a modulating operation on the fluid transmitted to the brake cylinders,
   said piston means including a first portion having the rear brake cylinder pressure acting thereon and a second portion having the master cylinder pressure acting thereon, and
   means responsive to a shift in the weight normally supported by the right and left wheels of the vehicle for varying the normal pressure-modulating operation of said valve means.

10. The invention as set forth in claim 9 which includes first and second modulating means and first and second means for controlling operation of said modulating means.

11. The invention as set forth in claim 10 wherein said modulating means comprises first and second proportioning valve assemblies, and wherein said first and second means for operatively controlling said modulating means are operable in response to a right and left turn of the vehicle.

12. The invention as set forth in claim 11 wherein said proportioning valve assemblies are operable to normally proportion brake fluid to said fluid operated brakes on said vehicle, and wherein said means for controlling operation of said valve assemblies are operable only during a cornering operation of the vehicle.

13. The invention as set forth in claim 12 wherein said means for controlling operation of said proportioning valve assemblies are responsive to the centrifugal force produced during a cornering operation of the vehicle.

14. The invention as set forth in claim 12 wherein said valve assemblies comprise reciprocable proportioning piston members, and wherein said means for controlling operation of said valve assemblies comprise first and second actuating elements movable to and from a position for preventing normal proportioning operation of said pistons.

15. The invention as set forth in claim 14 wherein said actuating elements are pivotable laterally of the vehicle about vertical axes.

16. The invention as set forth in claim 15 which includes spring means normally biasing said piston member toward a position opening a flow path from a master cylinder to said brakes, and wherein said actuating elements are pivotable about generally vertical extending laterally spaced axes for controlling operation of said spring means on said piston members.

17. The invention as set forth in claim 16, which includes a valve housing, a pair of generally laterally spaced bores in said housing, first and second piston members reciprocally mounted in said bores, spring means resiliently biasing said piston members to a position opening a flow path from a fluid source to said brakes, first and second actuating elements of predetermined mass pivotably connected to said housing and operatively engaged with said piston members for controlling normal reciprocal movement thereof, one of said actuating elements acting to prevent the associated of said piston members from moving toward an open position and the other of said actuating elements acting to prevent the associated of said piston members for moving toward a closed position during cornering of said vehicle.

* * * * *